United States Patent Office 2,808,848
Patented Oct. 8, 1957

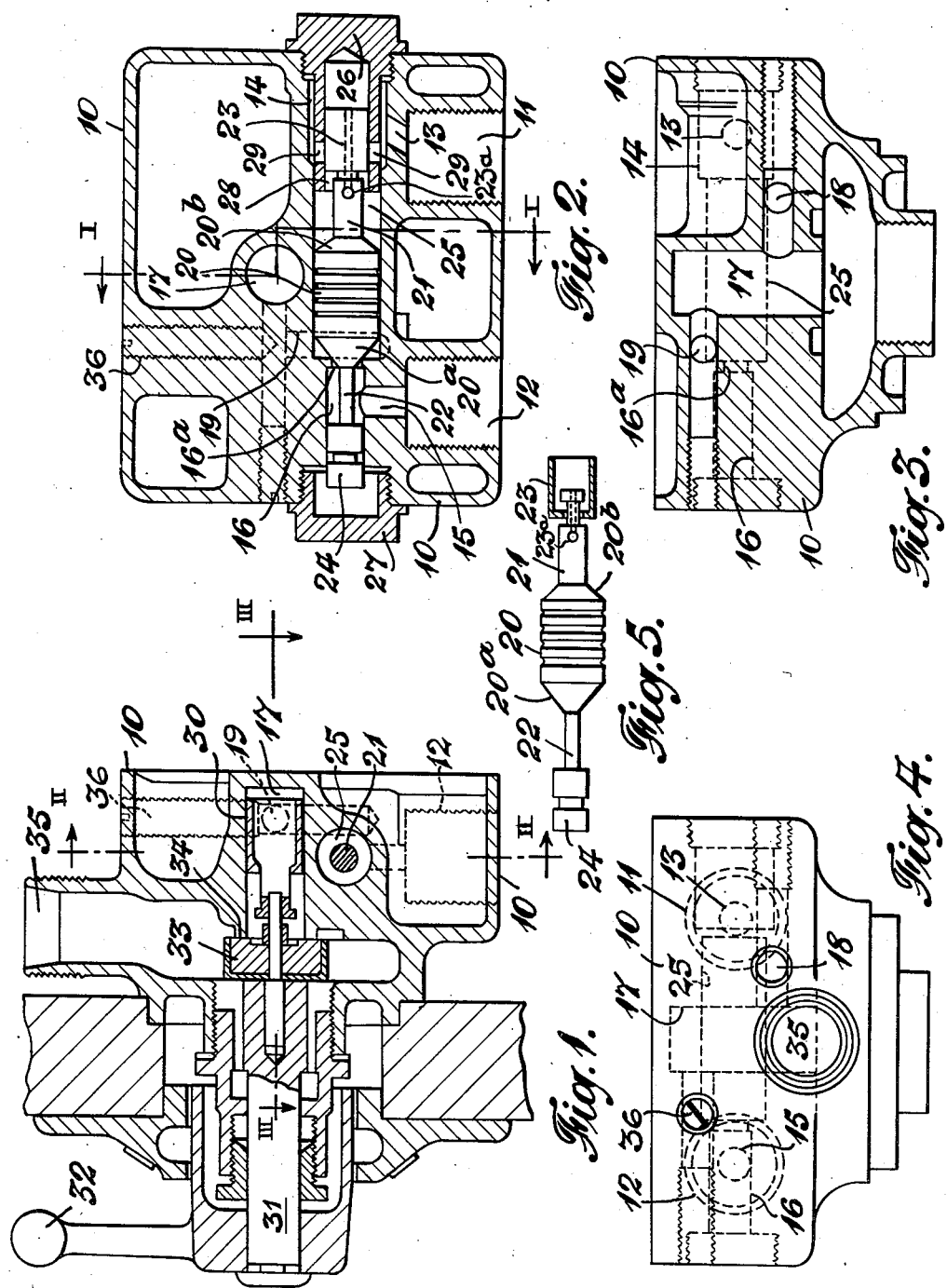

2,808,848
MIXING VALVE DEVICE FOR COLD WATER AND HOT WATER

Francis C. Cooper, Sprotborough, Doncaster, England

Application June 28, 1955, Serial No. 518,584

2 Claims. (Cl. 137—100)

This invention of a mixing valve device for cold water and hot water refers more particularly to mixing valves as used in bath installations for mixing cold water and hot water, and consists in the provision of a mixing valve assembly which performs three functions, viz: it provides a balance valve to ensure that hot water and cold water entering the mixing chamber are at equal pressures; it provides a non-return valve to prevent entry of cold water when at a higher pressure than the hot water, and vice versa, when the hot water is at a higher pressure than the cold water pressure; and it provides an anti-scalding arrangement to completely isolate the hot water supply if the cold water supply should fail.

A mixing valve assembly according to the invention includes a casing affording a cold water chamber, a hot water chamber and a mixing chamber, the cold and hot water chambers being provided with inlet branches for cold and hot water supply respectively, and having a common outlet controlled by a manually operable regulator valve, and an automatic piston valve arranged to control the flow of cold water and of hot water to the common outlet.

The invention will now be described with the aid of the accompanying drawings in which Fig. 1 is a side view in section of a mixing valve assembly according to the invention; Fig. 2 is a sectional view taken through the line II—II of Fig. 1; Fig. 3 is a sectional plan view taken through the line III—III of Fig. 1; the plane of the section of Fig. 1 is through the line I—I of Fig. 2; Fig. 4 is a plan of the casing shown in Fig. 1. For clearness the regulator valve and piston valve elements are omitted in Figs. 3 and 4. Fig. 5 is a side elevation of the piston valve removed from the assembly.

The same reference characters indicate corresponding parts in the several figures of the drawing.

Referring to the drawings, 10 indicates the valve casing, having an inlet 11 for cold water and an inlet 12 for hot water, the inlet 11 communicating by way of a port 13 with the cold water chamber 14, and the inlet 12 communicating by way of a port 15 with the hot water chamber 16. 17 indicates the mixing chamber which is in communication with the cold water chamber 14 by way of a port 18, and with the hot water chamber 16 by way of a port 19.

The piston valve includes a centrally disposed piston 20 formed at opposite ends with axial stems 21, 22, respectively furnished with bobbin heads 23, 24, the whole piston valve assembly being slidable in a cylindrical chamber 25.

The bobbin 23 at the cold water end of the chamber 25 is loosely mounted on the stem 21, while the bobbin 24 at the opposite, i. e., hot water, end of the chamber 25, operate in the hot water chamber 16 and, is fast on the stem 22.

The chamber 25 is closed at opposite ends by caps 26, 27 respectively screwed into the ends of the casing 10.

The end cap 26 is formed with a long sleeve 28, serving to provide a bearing for the bobbin 23 at the cold water end, the sleeve 28 being formed on opposite sides with registering ports 29. The bobbin 23 is formed with a vent hole 23$^a$ for escape of water which may be trapped behind it.

The admission of cold water and hot water to the mixing chamber 17 is controlled by a hollow sleeve 30 located in the cylindrical slideway forming the mixing chamber 17 manually operable by a screw threaded spindle 31 turnable by a handle 32. 33 indicates a shut-off valve adapted to contact with a seating 34 when it is desired to shut off the outlet 35.

In the initial opening of the valve 33 to allow a full flow of cold water through the outlet 35 the sleeve 30 is of such a length that it still covers the hot water port 19. Further withdrawal of the spindle 31 will progressively move the sleeve 30 to uncover the hot water port 19 to allow flow of hot water therethrough, while at the same time the cold water port 18 is closed in the same proportion restricting the flow of cold water until the desired temperature of the mixed water is reached.

The hot water port 19 is furnished with a regulating screw 36, see Fig. 2, whereby the final temperature of the delivery may be predetermined.

With the parts of the valve assembly in the positions shown in the drawings, that is, with the regulator valve 33 fully closed, the sleeve 30 completely covering the hot water port 19 and the cold water port 18 uncovered, and the piston 20 in its maximum forward position due to the cold water pressure being higher than the hot water pressure, the operation of the mixing valve is as follows.

On opening the outlet valve 33 the sleeve 30 follows the movement of the valve 33 but still maintaining the covering of the hot water port 19 and leaving the cold water port 18 fully uncovered, whereby there is an immediate drop in the cold water pressure in the chamber 25 and the piston 20 is out of balance. The hot water pressure acting on the head 20$^a$ of the piston 20 moves the piston 20 back until the sleeve 23 uncovers ports 29 and allows cold water to flow into the chamber 14 and thence through the port 18 into the mixing chamber 17.

The movement of the piston 20 continues until the cold water ports 29 are uncovered so as to allow cold water in sufficient volume to enter and press against the piston head 20$^b$ to equalise the the pressure of hot water against the piston head 20$^a$ when the piston 20 is then in balance.

On further opening of the valve 33 the sleeve 30 will uncover the hot water port 19 and progressively close the cold water port 18 thereby increasing the pressure on the piston head 20$^b$ and decreasing the pressure on the piston head 20$^a$ whereupon the piston 20 moves towards the hot water end of the valve and the sleeve 23 reduces the area of opening of the ports 29 so reducing the flow of cold water, and at the same time the bobbin 24 uncovers a greater area of the port 15 until the pressures are equalised and the volume of hot water entering the mixing chamber 17 is increased, so raising the temperature of the delivery.

If, for any reason, the pressure of the cold or hot water supply is varied, this will cause the piston 20 to move in the direction of the lower pressure, thereby uncovering a greater area of the ports on the lower pressure side and reducing the area of the ports on the higher pressure side until the balance is restored.

Should the cold water pressure fail, the pressure of the hot water acting against the hot water head of the piston will cause the bobbin 24 to be forced hard against the seating 16$^a$ in the end of the hot water chamber 16 and the bobbin 24 closes the port 15, thereby preventing passage of hot water.

Hot water is therefore completely isolated from the delivery outlet 35 while the cold water supply is off, thereby eliminating any risk of scalding.

An advantage of the improved mixing valve assembly is that it will function efficiently at extremely low pressures.

If desired, the piston 20 may be substituted by a flexible diaphragm held around its periphery in an annular groove in the valve casing and adapted to flex in the desired direction under the applied pressure of the cold or hot water in similar manner to the movements of the piston 20 as described.

I claim:

1. A mixing valve assembly comprising a casing incorporating a cold water chamber having a supply inlet, a hot water chamber having a supply inlet, a mixing chamber having a cylindrical slideway communicating with a discharge outlet, passageways respectively connecting the cold water and hot water chambers with the slideway of the mixing chamber, a manually operable regulator valve including a screw threaded spindle furnished with a handle, a valve element secured on said spindle and furnished with a hollow sleeve slidable in said cylindrical slideway, said cylindrical slideway communicating at one end with the discharge outlet where it affords a seating for the valve element, a piston valve comprising a piston slidable in a cylinder ported at opposite ends respectively to said passageways, the piston being formed at opposite ends with conical valve faces and with axial stems projecting therefrom, the stem at the hot water end being furnished at its distal end with a bobbin secured thereto and slidable in a cylindrical extension of reduced diameter of the piston cylinder forming the hot water chamber, the bobbin having a micrometric peripheral clearance in the said extension, said cylindrical extension at the piston end having a double sided valve seating and being ported to the hot water supply inlet so arranged that the port is covered or uncovered by movement of the aforesaid bobbin as the piston is moved in one direction or the other, and an end cap screwed into the valve casing and having a sleeve extension projecting into the piston cylinder at its cold water end, the axial stem at the opposite, cold water, end of the piston being furnished with a bobbin loosely mounted on the distal end of said stem and being slidable in said sleeve extension of the end cap, said sleeve extension being ported to the cold water chamber, the movements of the last-mentioned bobbin serving to cover and uncover the port in said sleeve as the piston is moved in one direction or the other.

2. A mixing valve assembly as claimed in claim 1, in which the bobbin secured to the stem of the piston at its hot water end is cylindrical and provides a valve head, and in which the bobbin at the opposite end of the piston is cylindrical and is provided with a vent hole for the escape of water from behind said bobbin.

References Cited in the file of this patent

UNITED STATES PATENTS

| 941,596 | White | Nov. 30, 1909 |
| 2,308,127 | Symmons | Jan. 12, 1943 |